(12) United States Patent
Grenier

(10) Patent No.: US 7,501,469 B1
(45) Date of Patent: Mar. 10, 2009

(54) CROSS-LINKED POLYOLEFIN MATERIAL BLEND

(75) Inventor: Gary C. Grenier, New Boston, NH (US)

(73) Assignee: Hendrix Wire & Cable, Inc., Milford, NH (US)

( * ) Notice: Subject to any disclaimer, the term of this patent is extended or adjusted under 35 U.S.C. 154(b) by 0 days.

(21) Appl. No.: 11/356,658

(22) Filed: Feb. 16, 2006

(51) Int. Cl.
  *C08L 23/26* (2006.01)
  *C08L 43/04* (2006.01)
  *C08K 5/00* (2006.01)
  *H01B 3/30* (2006.01)

(52) U.S. Cl. ............... 524/521; 524/500; 525/209; 174/110 SR; 174/110 PM

(58) Field of Classification Search .......... 524/521, 524/500; 525/192, 209; 174/110 SR, 110 PM See application file for complete search history.

(56) References Cited

U.S. PATENT DOCUMENTS

| 5,312,861 A | * | 5/1994 | Meverden et al. | ........... 524/521 |
| 5,430,091 A | * | 7/1995 | Mahabir | ............... 524/371 |
| 6,936,655 B2 | * | 8/2005 | Borke et al. | ................ 524/521 |

OTHER PUBLICATIONS

Schwartz et al, Plastics Materials and Processes, Van Nostrand Reinhold Co., N.Y., 1982, pp. 59-62.*

* cited by examiner

*Primary Examiner*—Fred M Teskin
(74) *Attorney, Agent, or Firm*—DLA Piper LLP (US); Jennifer E. Lacroix

(57) ABSTRACT

A material combination that is designed to replace current high-density polyethylene ("HDPE") materials for use with electrical transmission comprising at least one low density, cross-linkable polymer resin, at least one high density polymer, a cross-linking catalyst and an optional color masterbatch The material combination provides all of the existing properties found in the HDPE material with the addition of a higher temperature capability at/above 250° C.

4 Claims, No Drawings

CROSS-LINKED POLYOLEFIN MATERIAL BLEND

BACKGROUND OF THE INVENTION

1. Field of Invention

This invention finds use in the field of polymer material blends for use in products manufactured for the electrical utility market. In particular, this invention relates to a cross-linked polyolefin blend having characteristics compatible with the requirements of electrical utility products, upon molding.

2. Background

Thermoplastic materials have been used in the electrical industry for many years such as in 15 kV pin type polymeric insulator, introduced in 1969. Since that time additional insulators have been added, such as in the 25 kV and 35 kV categories. Vise-tops insulators, which include an integral cable clamp were added to each voltage category some time later. The thermoplastic material presently used to produce the insulators is a high-density polyethylene (HDPE). Stabilizers are incorporated in optimum percentages to maintain the original electrical and mechanical properties for the lifetime of the product as it is exposed to the environment, in particular ultraviolet (UV) light, and electrical stress from the energized cables and system. The stabilizers also impart other properties such as track and UV resistance. The final blended material possesses electrical and mechanical characteristics sufficient for the intended application.

However, the typical HDPE material has a temperature limitation at/below 120° C. A typical polyurethane insulator is used in overhead electrical applications to isolate electrical cables from ground. The insulator is required to meet all performance criteria of the applicable ANSI C 29.1 specification. It also is required to meet requirements of tracking and UV Resistance. Utilities have been required to carry heavier current loads resulting in hotter conductors. Current materials such as HDPE cannot meet such conditions.

Therefore, under present electrical transmission requirements, there exists a need for a material that can withstand conductor temperatures in excess of 120° C. without weakening or loss of structure and performance.

SUMMARY OF INVENTION

A new material combination that is designed to replace current high-density polyethylene ("HDPE") materials for use with electrical transmission products is disclosed herein. The new material combination provides all of the existing properties found in the HDPE material with the addition of a higher temperature capability at/above 250° C. The materials used in the blend are offered by multiple suppliers. The combination of components at or about the preferred percentage level imparts the desired balance of electrical and physical properties. A fourth component is added and made up of ingredients that add color, long-term stability from UV exposure, and track resistance. The result of this material combination is an insulator that will meet or exceed the American National Standards Institute (ANSI) requirements but with an elevated temperature capability.

DESCRIPTION OF PREFERRED EMBODIMENTS

As will be further described herein, the inventive formulation is generally comprised of four components:
1) Low density cross-linkable base resin;
2) High density resin;
3) Catalyst masterbatch; and
4) Color masterbatch.

The inventive material formulation utilizes a cross-linkable base resin and catalyst to obtain a higher temperature rating than conventional formulations. These cross-link materials are only commercially available as a low-density polyethylene (LDPE) resin because of the polymerization process used in their manufacture. In one embodiment of the invention, Silane based cross-linkable materials are used, such as the Aquathene AQ 120-00 Ethylene Vinylsilane copolymer product. Such low-density resins are not used in conventional materials for molding electrical transmission products as the low-density materials offer a significant reduction in mechanical strength. Further, previous attempts to use the low-density cross-linked material without a high-density component resulted in insulators with lower AC Voltage puncture strength. The material also showed a reduction in ability to support the mechanical loads applied from the typical installation. However, it is known to use such low density materials on cable jacketing, in which mechanical strength was secondary, in order to provide a high temperature material.

In order to restore the higher mechanical properties found in the current HDPE material a percentage of HDPE resin is added to the Silane material blend. The percentage of HDPE is added in levels high enough to obtain the required mechanical strength without preventing the cross-linking from occurring. The high-density component can be from a variety of sources. Two examples that can be used are from Equistar's Petrothene product category, which offers LM 6007-00, which is a blow molding grade and LR 5900-00, a wire and cable resin. It is preferred to use a high density material having a similar melt index to the low density material. In addition to providing mechanical strength, the high-density component also serves as an insulator and offers abrasion resistance.

The third component, used in connection with the low-density cross-link base resin, is the "catalyst masterbatch." A cross-linking catalyst, such as CM 04483 (Aquathene). Moisture is the mechanism that initiates and sustains the reaction that generates a cross-linked product. The two-part Silane base material has been used in extrusion of cables but it has not been used in a molding process. The large molded part thickness can create internal part voids, which are detrimental to the short and long term electrical characteristics of the part. These long molding cycle times can create problems with cross-link materials, which can cure and degrade the material during the molding process.

The final component is a "color masterbatch" which in the preferred embodiment added stabilizers and other components impart particular properties—one such is gray colorant—which are blended and pelletized with a high density polymer base The stabilization material is comprised of UV stabilizers, anti-oxidants, and other necessary components to impart specific electrical properties such as track resistance. Off-the-shelf stabilizer packages can be purchased from color suppliers for HDPE and LDPE materials. This inventive material combination is considered natural resin and thus would typically require stabilization for its intended use. Ciba, a supplier of stabilizers, offers anti-oxidants in the Irganox® family of products and Tinuvin® in the hindered amine light stabilizer category. A compounder will mix all the ingredients of the formulation with a base resin. The result of this particular formulation blend is a pellet that is designed to be let down at 19:1 or to be 5% (by weight) of the final formulation.

The following chart details one embodiment of the inventive compound which the inventor has found good operability, although other percentages may be used by those skilled in the art.

| Material Percentages | (at/about %) |
|---|---|
| Ethylene Vinylsilane copolymer | 53 |
| Catalyst masterbatch | 5 |
| High-density Polyethylene | 37 |
| Gray stabilizer masterbatch | 5 |
| Total | 100 |

Each of the four material components are presented and combined in pellet form using a gravimetric blender at the appropriate percentages. This dry blend is transferred to an injection-molding machine where it is melted and combined into a uniform melt using a dispersive mixing screw. The process conditions are optimized for material processing. Upon completion of the molding process the finished product requires either steam or immersion in hot water to promote moisture curing.

Results and Properties

The resulting material effectively increases the material capability to a level that exceeds the requirements for the typical utility electrical systems. The material will be rated at a temperature capability at or above 250° C. The material was tested to 427° C. producing acceptable results. The material has been used to manufacture and test an HPI 15, "F" neck insulator, which meets the requirements found in ANSI C 29.1, Class 55-4.

Some of those key material properties are Track Resistance per ASTM D 2303, Ultraviolet (UV) Resistance per ASTM G 155, and electrical and mechanical properties required for the application and the product design. Track resistance per ASTM D 2303 was tested and passes a 1500-minute test using the "Time to Track" method. Weatherometer (UV) aging was performed to ASTM G 26-90 specifications, Test Method 1 (continuous light, intermittent water spray), Apparatus Type A, Optical filter type A (borosilicate), Irradiance setting 0.45 W/m sq. @340 nm. Samples are expected to be aged 3000 hours and maintain a 75% of the original tensile and elongation properties.

The puncture strength was verified to be at/about 200 kV a significant increase over the ANSI design requirement of 95 kV. The insulator cantilever strength meets the 3000-pound requirement of ANSI C29.1. The material, meets the Environmental Stress Crack Resistance requirement of ASTM D 1693, condition B. The finished material Specific Gravity is at/about 0.9584 as reported from an independent laboratory. The average Melt Flow Rate for the combined base and catalyst were measured producing an average value of 0.1 g/10 min as reported from an independent laboratory. The dielectric constant is at/about 2.3 @1 mHz.

A proof test was done to simulate an actual cable installation. A 25' loop of 556.5 kcmil; compact, bare, aluminum conductor was heated to an elevated temperature of approximately 150° C. using amperages of 982 amps. The temperature was beyond the typical operation of electrical system conductors. A 150-pound weight was placed on the heated cable directly above a cross-linked insulator for 2 hours resulting in no damage or deformation to the insulator. A second proof test was conducted using a digital soldering iron. The soldering iron simulated an overheated conductor and offered precise heat control. The insulator was able to withstand temperatures exceeding 250° C. without melting.

The inventive blend was molded and tested on pin type insulators. The insulator requires the most stringent physical and electrical requirements of electrical transmission components. However, all transmission products can benefit equally from this improvement in operating temperature, particularly those in contact with cables, which can operate at elevated temperatures. The product list can include but should not be limited to splice covers, perch preventors, wildlife protection, spacers, and secondary products such as spreaders. The material will be used for the production of line insulators such as pin type. Post Type, Suspension, and Apparatus insulators are typically manufactured by others and assembled to create a final product but they could also benefit from these material improvements in operating temperature. The material modification is not limited to color. The work for this invention was done with a gray color but it can also be done with others such as black, depending on the intended operating and environmental factors of the end-use product.

In addition to the structures, sequences, and uses immediately described above, it will be apparent to those skilled in the art that other modifications and variations can be made the method of the instant invention without diverging from the scope, spirit, or teaching of the invention. Therefore, it is the intention of the inventor that the description of instant invention should be considered illustrative and the invention is to be limited only as specified in the claims and equivalents thereto.

I claim:

1. A compound for use in molded electrical transmission products, the compound comprising:
    a) at least one low density, cross-linkable polymer resin present at about 53% by weight of the total compound;
    b) at least one high density polymer present at about 37% by weight of the total compound;
    c) a cross-linking catalyst present at about 5% by weight of the total compound; and
    d) a color masterbatch including at least one colorant and at least one stabilizer present at about 5% by weight of the total compound.

2. The compound of claim 1 wherein the at least one low density, cross linkable polymer resin is a ethylene vinylsilane copolymer.

3. The compound of claim 1 wherein the at least one stabilizer is selected from the group consisting of UV stabilizers, anti-oxidants, amine light stabilizers, and track resistance compounds.

4. The compound of claim 1 wherein the at least one high density polymer is a high density polyethylene.

* * * * *